United States Patent [19]

Miller et al.

[11] Patent Number: 5,550,985
[45] Date of Patent: Aug. 27, 1996

[54] SPECIAL PURPOSE COMPUTER FOR DEMONSTRATING PERIPHERAL DEVICES SUCH AS PRINTERS IN WHICH POWER IS WITHDRAWN FROM THE PORT CONNECTION OF THE PERIPHERAL DEVICE

[75] Inventors: Warren L. Miller, Meridian; Harold B. Noyes, Boise, both of Id.

[73] Assignee: Hewlett-Packard Company, Palo Alto, Calif.

[21] Appl. No.: 236,950

[22] Filed: May 2, 1994

[51] Int. Cl.⁶ .............................. G06F 3/00; G06F 13/00
[52] U.S. Cl. ................... 395/750; 364/235; 364/235.7; 364/237.2; 364/225.6; 364/221; 395/309; 395/775; 395/101
[58] Field of Search .................................. 395/750, 275, 395/75, 101; 364/200, 257.2, 235, 235.7, 237.2; 400/719

[56] References Cited

U.S. PATENT DOCUMENTS

| 4,426,166 | 1/1984 | Bowling | 400/62 |
| 4,886,602 | 11/1989 | Hall | 364/200 |
| 5,090,830 | 2/1992 | Kroeger et al. | 400/719 |
| 5,179,710 | 1/1993 | Coschieri | 395/750 |
| 5,313,642 | 5/1994 | Seigel | 395/75 |
| 5,423,004 | 6/1995 | Porter | 395/275 |
| 5,438,678 | 8/1995 | Smith | 395/750 |

FOREIGN PATENT DOCUMENTS 3-264384  11/1991  Japan.

*Primary Examiner*—Thomas G. Black
*Assistant Examiner*—Greta Robinson

[57] ABSTRACT

A special purpose computer is used to demonstrate the operation of a computer peripheral such as a laser printer. The special purpose computer is connected to a data port of the computer peripheral. In the preferred configuration, the special purpose computer withdraws "leeched power" from data signal lines on the data port without requiring further connection to a power supply. The "leeched power" is used to charge a storage capacitor and operate an oscillator circuit. When power consumption by the storage capacitor and oscillator circuit has abated, the special purpose computer is able to respond to control inputs to address memory. This provides data outputs to the computer peripheral, thereby demonstrating its operation.

18 Claims, 4 Drawing Sheets

5,550,985

SPECIAL PURPOSE COMPUTER FOR DEMONSTRATING PERIPHERAL DEVICES SUCH AS PRINTERS IN WHICH POWER IS WITHDRAWN FROM THE PORT CONNECTION OF THE PERIPHERAL DEVICE

FIELD OF THE INVENTION

This invention relates to special purpose computers. More particularly, the invention relates to a special purpose computer which is used as a demonstrator display for a printer.

BACKGROUND OF THE INVENTION

It is often desired to provide a means of demonstrating products in a consumer/retail environment. This is done in order to facilitate sales demonstrations, and to allow the customer to "play with" the product without the assistance of sales personnel. In the case of a laser printer, the product is designed to be operated by a computer. Computers are often used to demonstrate printers, but the computer tends to add complexity to the demonstration. Additionally, the computer is often costly and distracts from the product. Other disadvantages of the use of a computer are that they are bulky and require additional arrangements for external power.

Some printer products have been provided with an internal demonstration mode. For simple products, such as a typewriter, this can be incorporated into the design at a low cost; however, the extent of data is, limited. In the case of printers having memory expansion capabilities, a "demo SIMM" has been inserted into a memory expansion slot to provide a demonstration function. This has the disadvantage that it requires that the "demo SIMM" be removed prior to sale, and that the customer be shown how to engage the demonstration.

Internal demonstration modes, such as the "demo SIMM", have the disadvantages of: 1) being difficult for the customers to use; 2) "taking over" the machine so that it can no longer operate in its normal mode; 3) requiring the product to have some means of adding the demonstration, such as a memory expansion slot or a font cartridge slot; and 4) the possibility of losing the "demo SIMM" or font cartridge when it is not removed before the machine is sold.

Significantly, some of the assignee's Laser Jet™ printers do not have either a memory expansion slot or a font cartridge slot. The use of a demonstration unit which requires either of these would not be possible.

The requirement of a separate power source for external demonstration devices is significant in the retail environment. In addition to requiring additional steps on installation, the availability of a separate power supply may be limited. Connections for a power supply tend to involve costly hardware capable of safely transmitting line voltage at specified current levels. In addition, the use of a power supply means that the demonstration device unit must be certified by the various certification agencies (e.g., Underwriters Laboratories, and the Federal Communications Commission) of the countries in which such a demonstration device is used.

It is also desired to be able to test printers in the field by providing a known external signal to the printer. In doing so, it is desirable to provide such tests separate from external factors, such as the normal driving computer, network connections, etc. Again, it is desired to provide such test signals without the requirement for providing a separate power connection.

The assignee's Laser Jet™ laser printers incorporate a Centronics "parallel" I/O port interface which permits direct computer "line port" connections. The Centronics "parallel" I/O interface is the de facto industry standard connector for computer printers. These connections typically do not include a discrete power connection. Another source of power is therefore normally used, should a power supply be necessary, as is the case where it is necessary to supply power to a network adaptor or buffer.

Prior art devices have used power supplies from an RS-232 interface. These include "security keys" for PCs and workstations, and serial mouse units. Both of these applications use a 12 volt supply available from a computer, and do not utilize the regulated $V_{cc}$ logic level power supply potential, which is normally 3 or 5 volts (although regulated 12 volt potential has in the past been utilized as $V_{cc}$). For efficiency and convenience it is desired that a special purpose computer be able to draw its power from the (5 volt) $V_{cc}$ interface without having specific connections designed to provide the required power, and without having a special accessory connection.

The power consumption of a special purpose computer for demonstrating a printer is used to generate an oscillation signal (power an oscillator), to retrieve and process data and to transmit the data. The initial powering up of the oscillator draws a significant amount of current and therefore would adversely affect a $V_{cc}$ supply potential. Once powered up, the oscillator uses significantly less current for maintenance and is substantially less likely to adversely affect $V_{cc}$.

The Centronics "parallel" I/O port connection includes several terminals which, as an aggregate, can be expected to receive power from the printer's power supply, but are not themselves power connections. It would therefore be desirable to "leech" power, or draw power from these terminals for running a special purpose computer without adversely affecting printer operation by this power draw.

It is therefore desired to provide a special purpose computer which is used as a demonstrator display for a printer, which is readily adaptable to the printer and which is easy to connect with, or disconnect from, the printer. It is desired to provide such a special purpose computer which is able to operate without separate connection to either a power supply or line current. It is further desired to provide such a special purpose computer which is able to provide a desired demonstration in a facile manner.

It is further desired to provide a simple test device for testing a printer or other computer peripheral. It is desired to be able to simply and easily achieve the testing by plugging the test device into the peripheral in order to determine the nature of the peripheral's response to external signals. It is desired to achieve such testing separately from computer connection, and without the requirement that the test device be separately connected to power.

SUMMARY OF THE INVENTION

In accordance with the present invention, a special purpose computer which is used as a demonstrator display for a printer is readily connected through a connection port for the printer. The computer takes the form of a display stand and provides data to the printer in a manner which substantially mimics the data which is provided by a general purpose computer which uses the printer as a peripheral unit.

In order to facilitate connection of the special purpose computer to the printer, the connection is effected by plugging in the special purpose computer to the printer's parallel port. Since the connection is through a standard printer port, the special purpose computer is adaptable to succeeding generations of printers. This means that the computer's adaptability to different printers is not dependent on the ability of different printers to accept similar expansion devices such as memory modules or font cartridges.

The connection of the special purpose computer to the printer is preferably a single plug connection, so that display setup consists of plugging the printer to power and to the display. This further assures power supply compatibility between the special purpose computer and the printer, because the special purpose computer in fact relies on the printer's power supply.

In accordance with a further aspect of the invention, the special purpose computer operates in a manner which allows it to operate without a separate power supply, by using "leeched power" from a connection port such as a parallel port. This is accomplished by using diode connections to port connections on which high potential levels appear. The diode connections limit current draw in excess of that which would result in the port connections being reduced by more than a predetermined potential minus a diode threshold voltage ($V_{cc}-V_T$). It is further possible to include direct connections to port terminals which are themselves protected, as for example is the case where a normally "high" signal is isolated by series resistance. The threshold voltage $V_T$ is the result of a requirement that the diode or other device be an enhancement mode device. An enhancement mode device must enhanced with minority carriers by the application of potential across the device in order for current to flow.

A further aspect of the invention permits testing of a computer peripheral by connection of such a special purpose computer. A line port connector to the peripheral is disconnected and the special purpose computer is attached to the port connection. This enables testing to be accomplished in a manner which excludes possible defects originating from the operation of the disconnected connection, and without the necessity to engage power supplies.

In a preferred embodiment, a portion of the circuitry on the special purpose computer receives power at a point in time after the first group connections are supplied with $V_{cc}$ power. This first group of connections includes an oscillator circuit which has substantial power consumption on ramping up, and a microprocessor or finite state machine which controls operation of the special purpose computer. This delays operation of the delayed portion of the circuitry until after current can be used without substantial degradation in the $V_{cc}$ potential. This is significant where "leeched power" could reduce potential on signal lines from which the "leeched power" is obtained. This permits the establishment of a "leeched power" $V_{cc}$ connection at the printer's parallel port without signal degradation from excessive power consumption. In furtherance of this, the special purpose computer uses an oscillator circuit which is "ramped up" or established in operation prior to exchange of logic signals between the special purpose computer and the printer.

According to a further aspect of the invention, a clock circuit which includes an oscillator circuit is left in a "sleep mode", wherein cyclical operation is suspended until a specified event. This allows conservation of power until such time as the specified event occurs. The specified event, typically a "start" signal, initiates the operation of the clock circuit, followed by operation of other circuitry, such as the circuitry in the special purpose computer.

This allows operation of a peripheral such as a printer by connection of a special purpose computer. The special purpose computer receives its power from "leeched power" from the connection. In a preferred embodiment, a portion of the circuitry on the special purpose computer receives power at a point in time after the first group connections are supplied with $V_{cc}$ power. This first group of connections includes an oscillator circuit which has substantial power consumption on ramping up, and a microprocessor or finite state machine which controls operation of the special purpose computer. The delayed portion preferably includes address and data circuits, and the signal output circuitry of the microprocessor or finite state machine.

DETAILED DESCRIPTION OF THE INVENTION

Figure 1:
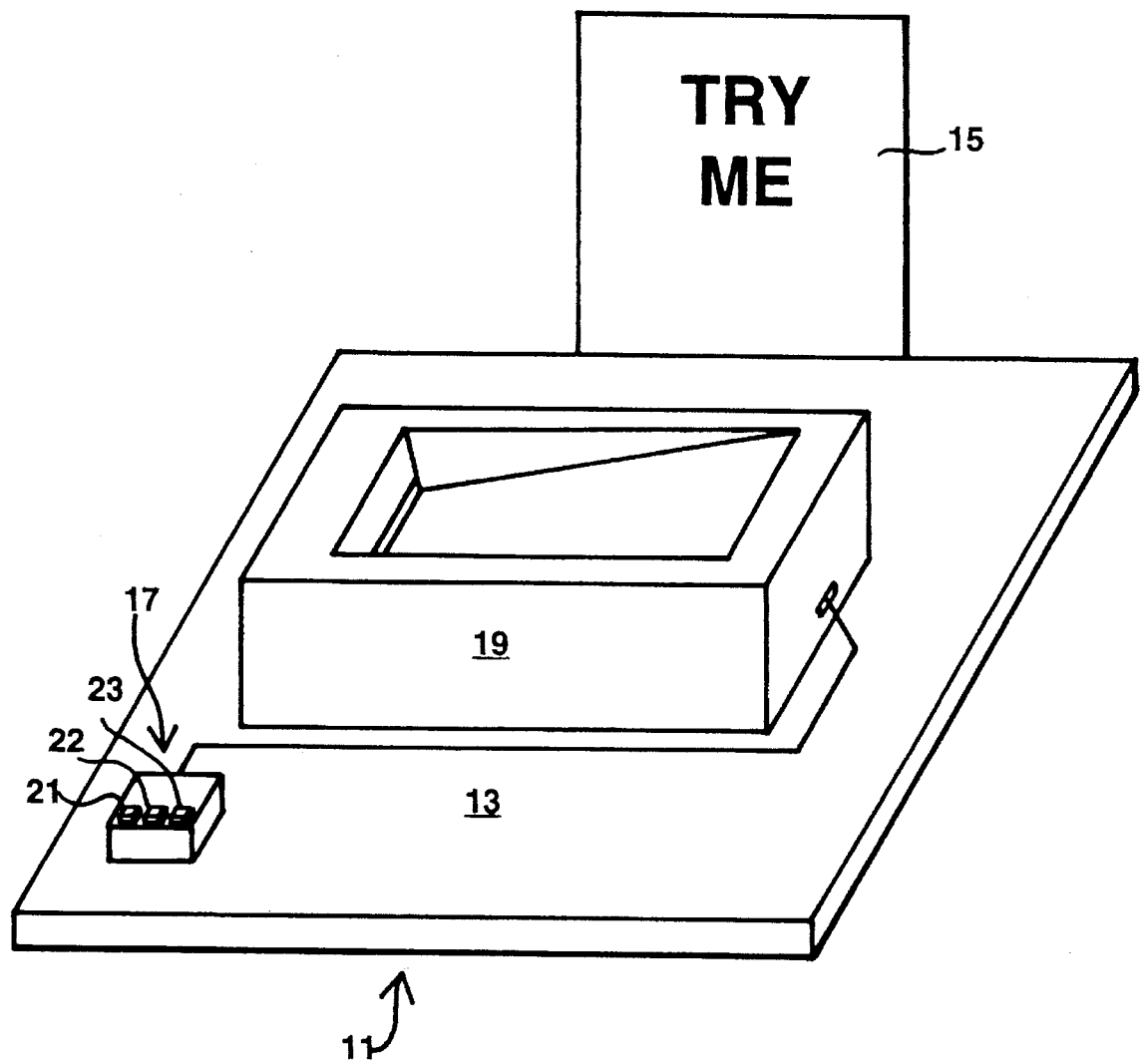
FIG. 1 shows a display configuration which utilizes the invention.

Referring to FIG. 1, a display unit 11 which incorporates the invention includes a stand 13 with display media 15, and a special purpose computer 17. The special purpose computer 17 is connected to a printer 19, such as a laser printer manufactured by the assignee of this patent. A plurality of buttons 21–23 on the special purpose computer 17 allow operation of the computer 17 in predetermined modes, providing different printer outputs, relating to such things as features or technical information.

The special purpose computer 17 is secured to the stand 13 and is plugged into the printer 19 at a parallel port on the printer 19. In the preferred embodiment, the parallel port on the printer is a Centronics parallel printer connector, which is currently the industry standard connector for computer printers.

Figure 2:
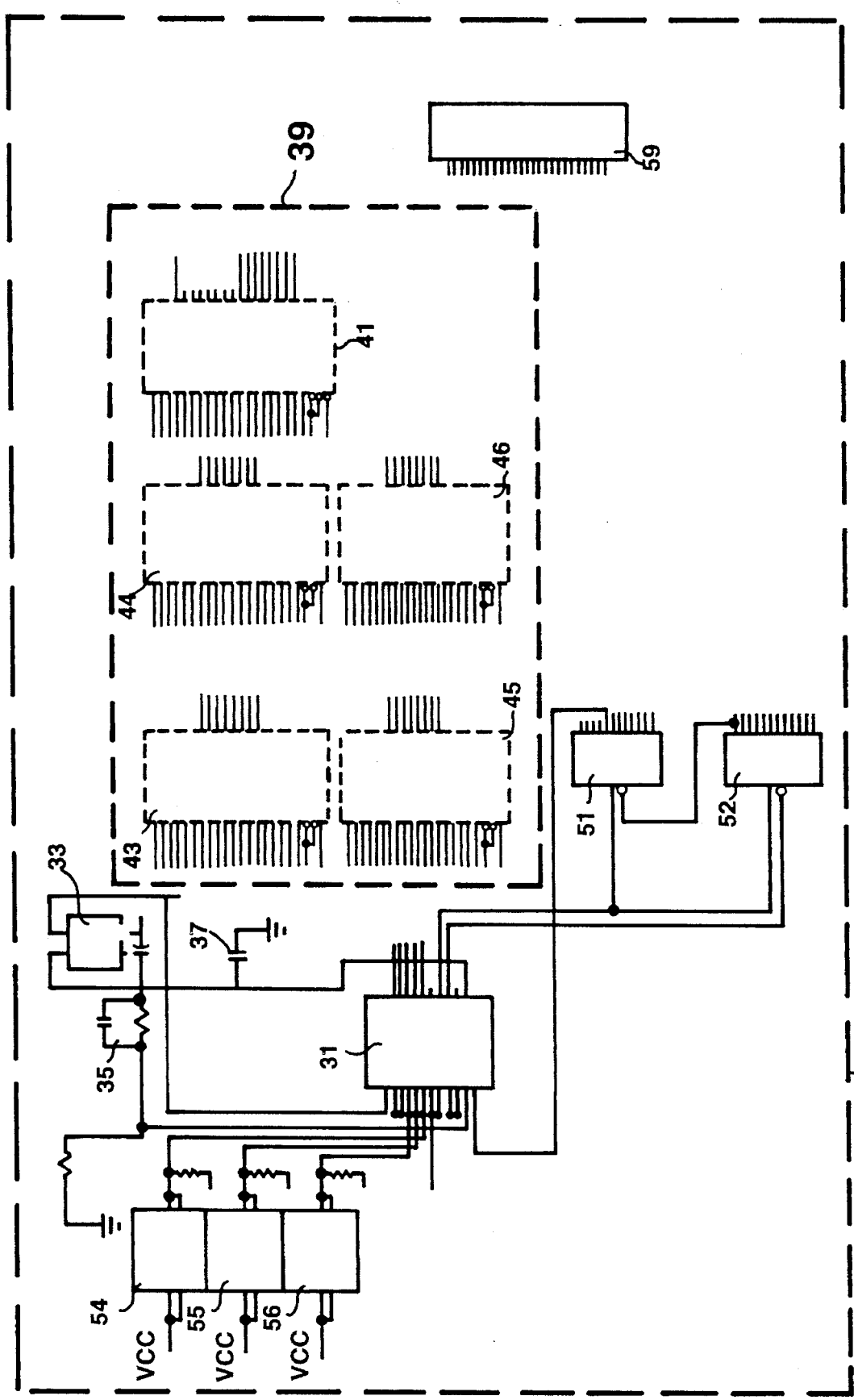
FIG. 2 schematically shows a configuration of the preferred embodiment of the invention, suitable for driving a computer printer.

FIG. 2 schematically shows the special purpose computer 17. A logic controller such as a finite state machine 31 forms the control logic. In the preferred embodiment, the finite state machine is a 22V-10 PAL, commonly available, for example from AMD. This is merely the initial preferred embodiment, and it is anticipated that a microprocessor will be used in later designs.

An oscillator 33 is connected to the finite state machine 31 and provides clocking information for the finite state machine 31. The ramping up of the oscillator 33 consumes substantially more power than the maintenance of a continuously oscillating signal by the oscillator 33. In addition to providing an output signal to the finite state machine 31, the oscillator receives its power from the finite state machine 31. The power to the oscillator 33, indicated on FIG. 2 as $V_{cc}$, also supplies an RC delay circuit 35, which in turn provides a control signal to the finite state machine 31. The RC delay circuit 35 slowly increases the potential of its output, so that, after a predetermined delay, that control signal goes to a logical high state. This predetermined delay is intended to permit the oscillator 33 to ramp up before the control signal goes to the logical high state.

In addition to the oscillator 33, a storage capacitor 37 initially consumes a substantial amount of power on initial power up of the special purpose computer 17. The storage capacitor 37 functions to stabilize the power supply of the special purpose computer 17 and the predetermined delay permits the storage capacitor 37 to build up charge prior to the control signal going to the logical high state. As a practical matter, the predetermined delay is affected by the charge of the storage capacitor 37, thus slowing the transition to the logical high state until the capacitor 37 is adequitely charged.

The finite state machine 31 controls addressing and data transfer of data from memory 39. These data operations are initiated after the predetermined delay, in response to the control signal. This accomplishes two purposes; delaying the consumption of power for memory and data transfer calls until the consumption of power for ramping up the oscillator 33 has subsided, and assuring the integrity of data transfer by performing data transfer operations when ample potential is available at $V_{cc}$.

The memory 39 in the preferred embodiment consists of a hard coded ROM 41, with provisions to provide one-time programmable memory 43–46. The one-time programmable memory 43–46 is substituted in applications where the use of hard coded ROM 41, is less than economical because of the number of units with a particular set of data. Blocks 43–46 are shown in dashed lines because the substitution of the one-time programmable memory 43–46 is an option which is provided for on the circuit board which accepts the hard coded ROM 41.

Address counters 51, 52 are also addressed in response to the control signal going to the high logical state. The operation of the address counters 51, 52 and the memory 39 is well known to those skilled in the art of computer addressing. In the preferred embodiment 74HC4040 address counters are used.

In addition to the control signal going to the high logical state, the finite state machine 31 addresses memory 39 and initiates operation of the address counters 51, 52 only after the receipt of an "initiate" signal. In the preferred embodiment, one of three "initiate" signals is transmitted by closing of one of three switches 54, 55, 56, in response to the pressing of respective ones of the plurality of buttons 21–23. The switches 54–56 provide addressing of one of three data sets through sequences as determined by the address counters 51, 52. It is of course possible to provide initiatization by any other convenient means, with the limit to the types of data sets being determined by the capacity of the finite state machine 31 and memory 39. While not especially desirable in the case of printers, it is also possible to provide for automatic initialization. Therefore, the performing of data transfer operations is preferably delayed until the coincidence of the "initiate" signal and the control signal going to the high logical state.

The finite state machine 31 transmits data which is obtained from addressing the memory 39 to data lines to a parallel port 59 of the computer 19 by causing data from memory 39 to be output to the parallel port 59.

Figure 3:
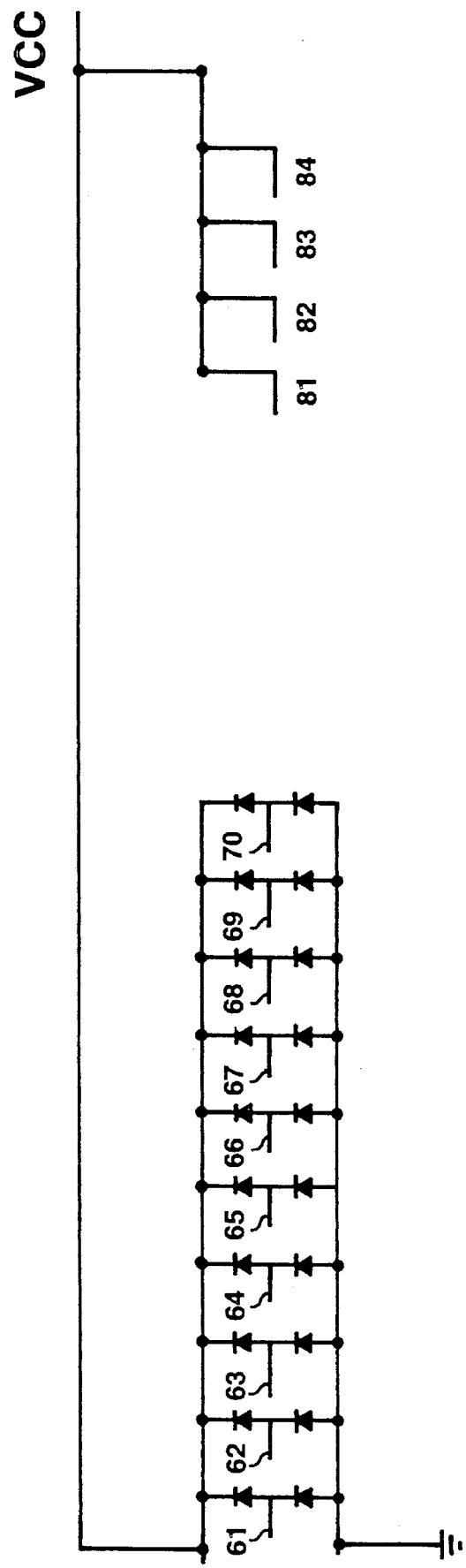
FIG. 3 shows connection circuitry wherein "leeched power" is obtained from a parallel port connection.

FIG. 3 shows an arrangement whereby "leeched power" for $V_{cc}$ is obtained from the parallel port 59. The center connections are the connections to the terminal connections to the parallel port 59. As can be seen, a plurality of the terminal connections 61–70 are diode connected between a $V_{cc}$ bus 77 and ground. The diode connections prevent reverse current from flowing in a manner which would allow potential from the $V_{cc}$ bus 77 to either ground or the terminal connections 61–70. The diodes do, however, permit current to flow between the terminal connections 61–70 and the $V_{cc}$ bus 77 when the potential on any of the terminal connections 61–70 exceed the potential on the $V_{cc}$ bus 77 by a diode threshold potential ($V_T$). Thus, the flow of current between the terminal connections 61–70 and the $V_{cc}$ bus typically only occurs when the potentials at one of the terminal connections 61–70 exceeds the potential at the $V_{cc}$ bus.

The result is that the potentials at the terminal connections 61–70 are maintained while withdrawing power from the terminal connections 61–70 when signals at the connections 61–70 are at high logic levels, while maintaining the potentials at these connections 61–70 approximately at the high logic levels. The potentials are reduced because current is allowed to flow, but in the preferred embodiment all signals which are required to be held at high logic levels are allowed to remain at those logic levels.

Diodes between the terminal connections 61–70 and ground accomodate current leakages and other inbalances in potentials at the terminal connections 61–70. Terminal connections 81–84, are also provided, but do not require the diodes for isolation because line impedances for those connections in the printer 19 are sufficiently high to prevent overload or current drain and because these connections normally have potentials at the desired high level. It is nevertheless possible to use the diodes as resistance devices or the protect against reverse current. The terminal connections 61–70 and 81–84 thereby supplies the "leeched power" to the special purpose computer 17.

The storage capacitor 37 functions to store enough charge to allow operation of the special purpose computer 17 at times when there are momentary increases in power consumption. The storage capacitor 37 also stores charge sufficient to allow operation of the special purpose computer 17 when insufficient current flow can be obtained as "leeched power" from the terminal connections 61–70 and 81–84. Thus the terminal connections 61–70 provide a continuous power supply for the special purpose computer 17, at least in the sense that power need not be supplied from another external source or from the storage capacity of a battery.

In operation, the special purpose computer 17 is plugged into the printer 19. When the printer 19 is powered up, "leeched power" is provided and is used to charge the storage capacitor 37 without any intervention by the finite state machine 31 or other active circuitry. The special purpose computer 17 is activated, as by pressing one of the button switches 54–56. On initiation, the finite state machine 31 waits for the potential from the RC delay circuit 35 to reach a predetermined level, corresponding to a high logic level, and then uses the address counters 51, 52 to provide an address sequence to address memory 39. In the preferred embodiment, the particular one of the three button switches 54–56 causes a particular selection of address memory to be addressed.

In the preferred embodiment, the initiation of operation of the special purpose computer 17 effects a demonstration of the printer 19. The special purpose computer 17 is also used without the associated display stand 13 as a tester for the printer 19.

In order to further conserve power used by the special purpose computer, a "sleep mode" is employed. This provides three functions:

a) a digital signal turns the clock off after the finite state machine 31 performs its task;

b) a digital signal turns the clock on when a start signal is received; and c) a reset circuit allows the clock to stabilize before the finite state machine 31 starts running.

Figure 4:
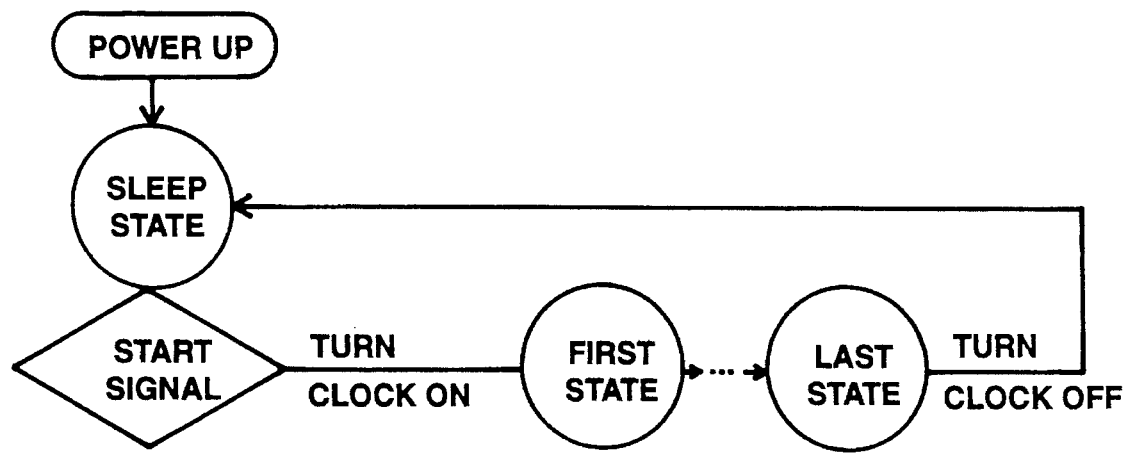
FIG. 4 shows in block diagram form the operation of a "sleep mode" for the special purpose computer.

Referring to the block diagram of FIG. 4, the finite state machine 31 goes to a "sleep mode" (identified as "sleep state") when it is initially powered up. A "start signal", is preferrably one of three "initiate" signals is transmitted by closing of one of three switches 54, 55, 56, in response to the pressing of respective ones of the plurality of buttons 21–23. The receipt of the "start signal" initiates turning on the oscillator 33, which then initiates a "first state". The "first state" is preferrably the ramping up of the oscillator 33. This is followed by the provision of the control signal to the finite state machine 31 after the previously-mentioned predetermined delay. As mentioned above, this predetermined delay is intended to permit the oscillator 33 to ramp up before the control signal goes to the logical high state.

The clock circuit which includes the oscillator 33 and the finite state machine 31 is left in a "sleep mode", wherein cyclical operation is suspended until the "initiate" signal is received. This allows conservation of power until such time as the "initiate" signal is received. This initiates the operation of the clock circuit, followed by operation of other circuitry in the special purpose computer 17.

Figure 5:
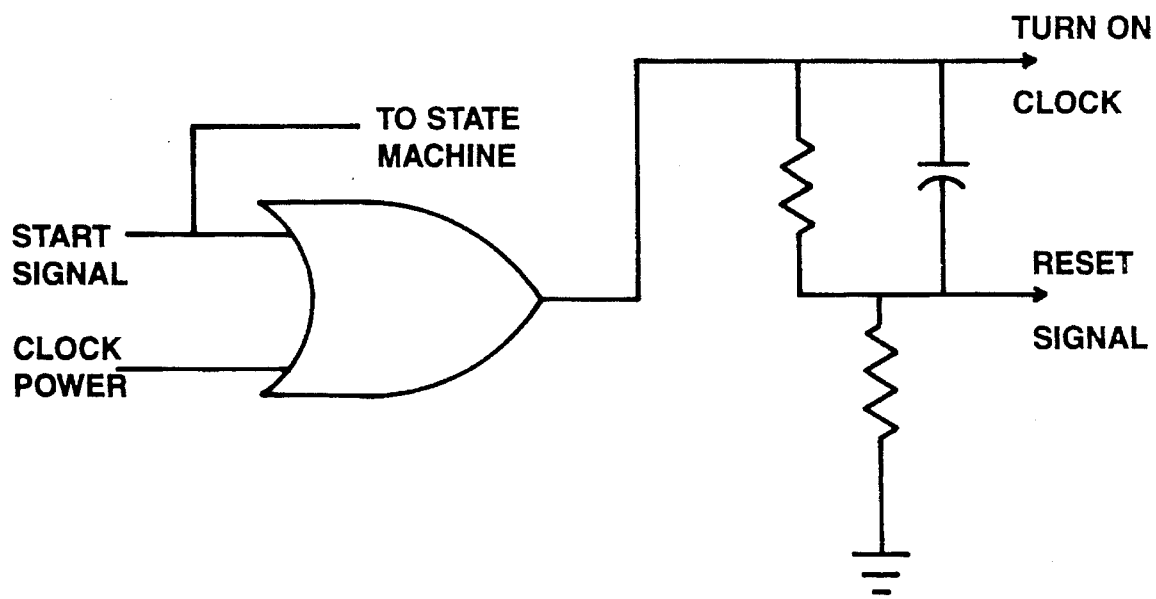
FIG. 5 schematically shows a clock circuit which employs the "sleep mode".

FIG. 5 schematically shows a circuit which employs the sleep mode. The logic is preferably part of the finite state machine 31, and includes a NOR gate 91.

The above is a description of an initial configuration of the preferred embodiment of the invention. It is anticipated that in the future, various modifications to the invention will be made. For example, the finite state machine 31 may be replaced with a microprocessor, and that such a microprocessor may include one or more of the separate elements of the circuit described above.

While the memory 39 has been described as hard coded ROM 41 or one-time programmable memory 43–46, it is possible to provide other forms of non-volitile or volitile memory, or any other suitable data store to perform the memory function. It is likewise possible to provide a more sophisticated logic controller, such as a microprocessor, for the finite state machine 31. The logic controller could incorporate other components such as memory 39 and address counters 51, 52.

As mentioned above, the use of the invention with other computer peripheral devices is also anticipated. Instead of providing outputs to a computer peripheral device, it is further possible to provide outputs to a computer, thereby demonstrating the response of the computer to particular outputs of the special purpose computer. It is also possible to use the inventive concepts in association with a separate input port. In such a case, the invention would be useful as a network interface or a printer adaptor. It is therefore anticipated that the invention should be limited in scope only by the claims.

What we claim is:

1. A method of operating a computer peripheral device to demonstrate the operation of the computer peripheral device comprising:

a) providing a special purpose computer;

b) connecting the special purpose computer to a connection port for the computer peripheral device, wherein the computer peripheral device has a plurality of signal lines terminating at the connection port, a plurality of said signal lines having potentials generated by the computer peripheral device which are at levels which correspond to high logic levels for communications through the connection port;

c) withdrawing power from the computer peripheral device through at least one of said plurality of signal lines while maintaining the potentials of said plurality of signal lines approximately at said high logic levels;

d) using said power from the computer peripheral device to operate the special purpose computer; and e) using the special purpose computer to operate the computer peripheral device, with said connection port providing a power supply connection to supply power from the computer peripheral device to the special purpose computer, whereby said special computer is able to operate with said connection port providing the sole continuous power supply to the special purpose computer.

2. The method of operating a computer peripheral device as described in claim 1, further comprising:

a) storing power which is withdrawn from said plurality of signal lines in the special purpose computer; and b) withdrawing said power from at least one of the plurality of signal lines through a semiconductor device which allows current to flow after potential across the semiconductor device has reached a threshold voltage.

3. The method of operating a computer peripheral device as described in claim 2, further comprising:

storing said power in a capacitor, wherein said stored power is sufficient to maintain the special purpose computer in an operating state over a period of time which allows the special purpose computer to provide substantially continuous data stream to provide said operation of the computer peripheral device.

4. The method of operating a computer peripheral device as described in claim 1, further comprising:

storing said power in a capacitor, wherein said stored power is sufficient to maintain the special purpose computer in an operating state over a period of time which allows the special purpose computer to provide substantially continuous data stream to provide said operation of the computer peripheral device.

5. The method of operating a computer peripheral device as described in claim 1, further comprising:

a) storing power which is withdrawn from said plurality of signal lines in the special purpose computer; and b) withdrawing said power from at least one of the plurality of signal lines through a semiconductor device which allows current to flow after potential across the semiconductor device has reached a threshhold voltage; and c) in addition to withdrawing power from at least one of said plurality of signal lines while maintaining the potentials of said plurality of signal lines approximately at said high logic levels, withdrawing power from at least one other line directly without providing a semiconductor device having a threshold voltage.

6. The method of operating a computer peripheral device as described in claim 1, further comprising:

preventing predetermined responses of the special purpose computer until potential of said operating power supply for the special purpose computer has been allowed to increase to a predetermined level.

7. The method of operating a computer peripheral device as described in claim 1, further comprising:

providing a time delay; and preventing predetermined responses of the special purpose computer until after said time delay.

8. The method of operating a computer peripheral device as described in claim 1, further comprising:

preventing predetermined responses of the special purpose computer until potential of said operating power supply for the special purpose computer has been allowed to increase to a predetermined level; and providing said predetermined responses in response to operator action to which the special purpose computer responds.

9. The method of operating a computer peripheral device as described in claim 1, further comprising:

providing a time delay;

preventing predetermined responses of the special purpose computer until after said time delay; and providing said predetermined responses in response to operator action sensed by the special purpose computer.

10. The method of operating a computer peripheral device as described in claim 1, further comprising:

said computer peripheral device being a computer printer; and said special purpose computer generating data which is used to generate responses from the computer printer, said responses including data for the computer printer to print.

11. The method of operating a computer peripheral device as described in claim 1, further comprising:

the demonstration of the computer peripheral device effecting a test sequence.

12. A method of operating a computer peripheral device to demonstrate the operation of the computer device comprising:

a) providing a special purpose computer;

b) connecting the special purpose computer to a connection port for the computer peripheral device, wherein the computer peripheral device has a plurality of signal lines terminating at the connection port, a plurality of said signal lines having potentials generated by the computer peripheral device which are at levels which correspond to high logic levels for communications through the connection port;

c) withdrawing power from the computer peripheral device through at least one of said plurality of signal lines while maintaining the potentials of said plurality of signal lines approximately at said high logic levels d) using said power withdrawn from the computer peripheral device to operate the special purpose computer;

e) withdrawing said power from at least one of the plurality of signal lines through a semiconductor device which allows current to flow after potential across the semiconductor device has reached a threshold voltage;

f) providing a time delay; and g) preventing predetermined responses of the special purpose computer until potential of said operating power supply for the special purpose computer has been allowed to increase to a predetermined level by preventing said predetermined responses until after said time delay; and h) after said potential of said operating power supply for the special purpose computer has increased to said predetermined level, using the special purpose computer to operate the computer peripheral device, with said connection port providing a power supply connection to supply power to the special purpose computer, said operation of the computer including providing predetermined outputs in response to operator action sensed by the special purpose computer, whereby said special computer is able to operate with said connection port providing the sole continuous power supply to the special purpose computer.

13. The method of operating a computer peripheral device as described in claim 11, further comprising:

in addition to withdrawing power from at least one of said plurality of signal lines while maintaining the potentials of said plurality of signal lines approximately at said high logic levels, withdrawing power from at least one other line directly without providing a semiconductor device having a threshold voltage.

14. The method of operating a computer peripheral device as described in claim 11, further comprising:

said computer peripheral device being a computer printer; and said special purpose computer generating data which is used to generate responses from the computer printer, said responses including data for the computer printer to print.

15. A method of operating a computer peripheral device to demonstrate the operation of the computer peripheral device comprising:

a) providing a special purpose computer including a logic controller and memory;

b) connecting the special purpose computer to a parallel connection port for the computer peripheral device, wherein the computer peripheral device has a plurality of signal lines terminating at the parallel connection port, a plurality of said signal lines having potentials generated by the computer peripheral device which are at levels which correspond to high logic levels for communications through the parallel connection port;

c) withdrawing power from the computer peripheral device and using said power from the computer peripheral device through selected ones of said plurality of signal lines to operate the special purpose computer;

d) using the logic controller to address the memory in predetermined sequences; and e) providing an output of the memory in the predetermined sequences to the computer peripheral device through said parallel connection port.

16. The method of operating a computer peripheral device as described in claim 1, further comprising:

a) said parallel connection port for the computer peripheral device having a plurality of signal lines terminating at the parallel connection port having potentials generated by the computer peripheral device which are at levels which correspond to high logic levels for communications through the parallel connection port;

b) withdrawing said power from the computer peripheral device by withdrawing power from at least one of said selected signal lines while maintaining the potentials of said plurality of signal lines approximately at said high logic levels; and c) using the special purpose computer to operate the computer peripheral device, whereby said special computer is able to operate with said parallel connection port providing the sole continuous power supply to the special purpose computer.

17. A special purpose computer to demonstrate the operation of the computer peripheral device comprising:

a) a control logic circuit;

b) a data store addressable as memory by the control logic circuit;

c) a connector for connecting the special purpose computer to a connection port of the computer peripheral device, wherein the computer peripheral device has a plurality of signal lines terminating at the connection port and a plurality of said signal lines have potentials generated by the computer peripheral device which are at levels which correspond to high logic levels for communications through the connection port the connector permitting the control logic circuit to control operation of the computer peripheral device through the connector;

d) a threshold voltage device for withdrawing power from The computer peripheral device through the connector and using said power to operate the special purpose computer solely by the use of power obtained from computer peripheral device; and e) an electrical power storage device, capable of storing said power withdrawn from the plurality of signal lines as operating power for the special purpose computer.

18. The special purpose computer as described in claim 17, further comprising:

f) a circuit for providing a time delay;

g) a circuit for preventing predetermined responses of the special purpose computer until potential of said operating power supply for the special purpose computer has been allowed to increase to a predetermined level by preventing said predetermined responses until after said time delay; and h) a circuit for generating said predetermined responses after said potential of said operating power supply for the special purpose computer has increased to said predetermined level, wherein said stored power is sufficient to maintain the special purpose computer in an operating state over a period of time which allows the special purpose computer to provide substantially continuous data stream to provide said operation of the computer peripheral device.

* * * * *